Patented Mar. 17, 1925.

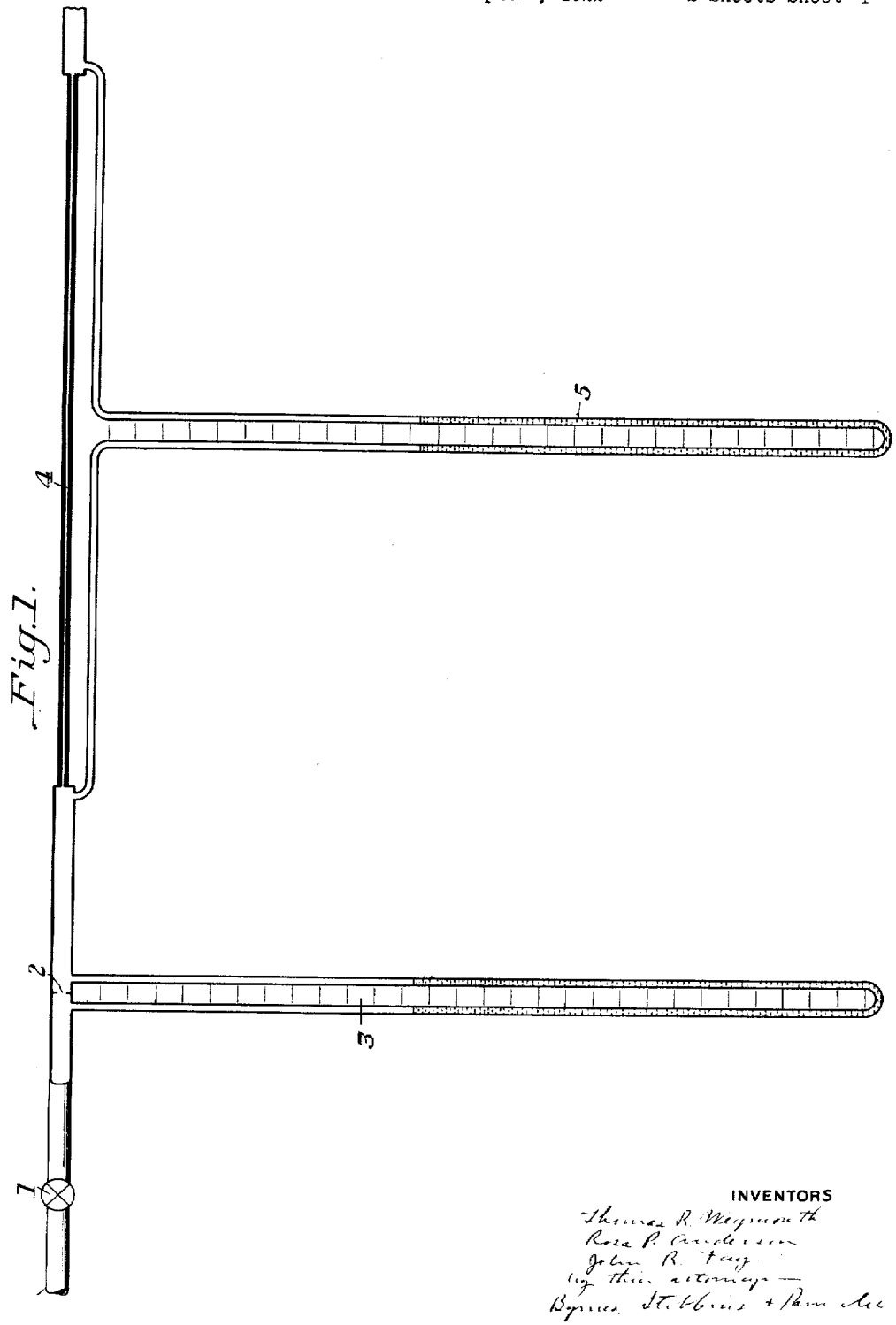

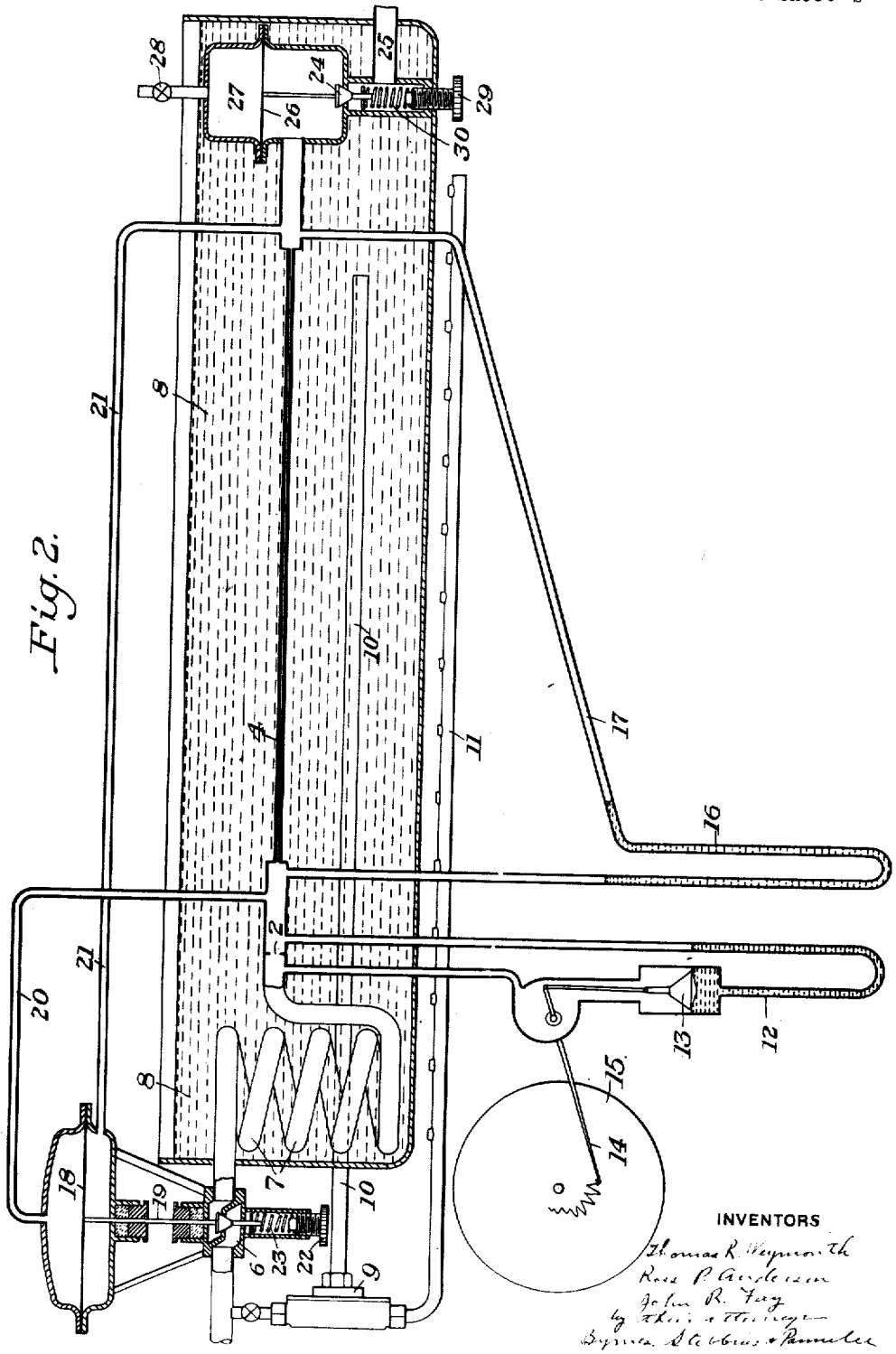

1,530,222

UNITED STATES PATENT OFFICE.

THOMAS R. WEYMOUTH, ROSS P. ANDERSON, AND JOSEPH R. FAY, OF OIL CITY, PENNSYLVANIA.

DETERMINATION OF THE SPECIFIC GRAVITY OF FLUIDS.

Application filed September 2, 1922. Serial No. 585,921.

*To all whom it may concern:*

Be it known that we, THOMAS R. WEYMOUTH, ROSS P. ANDERSON, and JOSEPH R. FAY, all residing at Oil City, Venango County, Pennsylvania, have invented a new and useful Improvement in the Determination of the Specific Gravity of Fluids, of which the following is a full, clear, and exact description, reference being had to the accompanying drawings, forming part of this specification.

Our invention relates to apparatus for determining the specific gravity of fluids.

In measuring fluids, either gaseous or liquid, by means of orifice meters, Pitot tubes, Venturi meters and other rate-reading instruments, it is necessary to know the specific gravity of the fluid being measured. Since the character of fluid changes from time to time in certain cases, such as in the measurement of gases and of some liquids, it is desirable to have a means of determining quickly and readily the specific gravity changes under such changing conditions.

It is well known that there are two kinds of fluid flow, namely, stream-line flow, in which the pressure drop required to produce the flow is practically independent of the density or specific gravity of the fluid, and turbulent flow, in which the pressure drop is proportional to the density. The flow through a thin plate orifice under certain conditions is turbulent, and the pressure drop accompanying the flow can therefore be used as a measure of the specific gravity of the fluid. The flow through a capillary tube under proper conditions is stream-line, and the pressure drop is therefore practically independent of the specific gravity.

In the illustrated embodiment of the invention, which is a device for determining the specific gravity of gaseous fluids, we employ a thin plate orifice in which, as stated above, the differential pressure is dependent upon the specific gravity of the fluid, in this case, a gas. In series with this orifice, we supply means independent of the specific gravity for measuring or regulating the amount of gas fed to the apparatus. Such means may be a capillary tube, the rate of flow through which is independent of the specific gravity, as stated above.

By adjusting the gas inlet to get a measured differential pressure over the capillary tube, it is possible to get any desired rate of flow through the apparatus. With a given flow of gas through the orifice, the differential pressure across the orifice is a measure of the specific gravity of the gas under given conditions of temperature and pressure.

In the accompanying drawings:

Figure 1 is a diagrammatic view showing a simple form of our device comprising a thin plate orifice in series with a capillary tube and a manometer for each;

Figure 2 is a view, largely diagrammatic, showing an embodiment of our invention adapted to record specific gravity.

As shown in the embodiment of the invention illustrated in Figure 1, the gas whose specific gravity is to be determined enters through the valve 1 to the thin plate orifice 2. A U-tube manometer 3 is provided for measuring the differential pressure across the orifice 2. After passing through the orifice 2, the gas passes through the capillary tube 4, which is also provided with a U-tube manometer 5. From the capillary tube 4 the gas is discharged into the atmosphere.

In using this simple form of apparatus, gas is admitted by opening the valve 1, which is regulated to get the desired rate of flow, as indicated by the manometer 5. The reading of the manometer 3 is then a measure of the specific gravity of the gas being tested. The scale of the manometer 3 may be calibrated to read directly in specific gravity. This reading may be corrected for temperature and barometric pressure by means of charts or tables, which may be prepared by passing gases of known specific gravity through the apparatus and varying the temperature and pressure.

In the embodiment of the invention illustrated in Figure 2, the gas enters through a diaphragm-regulated valve 6, which as hereinafter described is controlled to maintain a constant rate of flow. After leaving the valve 6, the gas passes through a coil 7 which is immersed in the water bath 8, maintained at a constant temperature, in order to get the gas to a constant predetermined temperature before it passes through the orifice 2.

A valve 9, controlled by a thermostat 10, regulates a gas burner 11, to maintain the temperature of the water bath constant.

The differential pressure across the orifice 2 is a measure of the specific gravity of the gas. This differential pressure is measured and recorded by means of a U-tube manometer 12, filled with mercury and having a float 13, which is connected with a stylus 14, for recording the pressure on a disk chart 15, which may be driven by clockwork. This float type recording gauge is well known in this art, and need not be illustrated or described in greater detail.

The gas flows from the orifice 2 through a capillary tube 4, also immersed in the constant temperature water bath 8.

The differential pressure across the capillary tube 4 is indicated by means of a U-tube manometer 16, which is provided with an inclined portion 17, like an ordinary draft gauge, in order to give accurate readings.

The valve 6 is automatically regulated to maintain a constant flow of the gas across the orifice by means of the diaphragm 18 connected to the valve stem 19. A tube 20 at the inlet end of the capillary tube 4 transmits pressure at this point to the upper side of the diaphragm 18, and a tube 21 connected at the outer end of the capillary tube 4 transmits pressure at this point to the underside of the diaphragm 18. Since the differential pressure across the capillary tube 4 is independent of the specific gravity and at a constant pressure and temperature is dependent upon the rate of flow, the valve 6 will maintain a constant rate of flow through the apparatus independently of the specific gravity of the gas. A thumbscrew 22 operating on the valve spring 23 is used to adjust the rate of flow to any desired predetermined amount to keep any desired constant differential pressure across the capillary tube 4, as indicated by the manometer 16.

The gas flows from the capillary tube 4 through a diaphragm-operated valve 24, to the discharge tube 25. Above the valve-controlling diaphragm 26 is a closed chamber 27, so as to maintain a constant pressure above the diaphragm. This pressure may be varied by admitting or letting out air through the valve 28. The entire valve body, including the chamber 27, is immersed in the constant temperature water bath 8.

A thumbscrew 29 operating on the valve spring 30 provides an adjustment by means of which the exit pressure of the gas from the capillary tube may be adjusted. The valve is preferably adjusted so that this exit pressure is slightly above atmospheric pressure. The valve serves to maintain such exit pressure regardless of the barometric fluctuations.

Since the valve 6 maintains a constant differential pressure across the capillary tube and since the valve 24 maintains a constant absolute pressure at the exit of the capillary tube, the rate of flow of gas through the apparatus will be maintained constant. Any variations in the differential pressure across the orifice 2 will be a true measure of the variation in the specific gravity of the gas being measured, since the temperature is maintained constant by the water bath and the pressure is maintained constant by the valves 6 and 24. The specific gravity is recorded on the chart 15 which may be graduated to read the specific gravity directly.

While the drawings illustrate the preferred embodiments of our invention, it will be understood that various changes may be made in the details of construction or mode of operation within the scope of the following claims.

We claim:

1. Apparatus for measuring the specific gravity of fluids, comprising a casing having two chambers with a connecting orifice, means for supplying fluid to said orifice at a determinate rate, and means for measuring the differential pressure between the two chambers, substantially as described.

2. Apparatus for measuring the specific gravity of fluids, comprising a pipe with an obstruction having an orifice, means for measuring the pressure on opposite sides of the obstruction, and means independent of the specific gravity of the fluid for regulating the rate of flow through the orifice, substantially as described.

3. Apparatus for measuring the specific gravity of fluids, comprising a pipe provided with an obstruction having an orifice, means for measuring the differential pressure developed by the fluid flow through the orifice, a capillary tube in series with the orifice, and means for measuring the differential pressure developed by said fluid flow through the capillary tube, substantially as described.

4. Apparatus for measuring the specific gravity of fluids, comprising a flow pipe having an obstruction with an orifice, means for measuring the differential pressure across the orifice, a capillary tube in series with the orifice, and means for maintaining a constant pressure difference between the ends of said capillary tube, substantially as described.

5. Apparatus for measuring the specific gravity of fluids, comprising a flow pipe having an obstruction with an orifice, means for measuring the differential pressure across the orifice, a capillary tube in series with the orifice, means for maintaining a constant pressure difference between the ends of the capillary tube, and means for maintaining a constant outlet pressure on the capillary tube, substantially as described.

6. Apparatus for measuring the specific gravity of fluids, comprising a flow pipe having an obstruction with an orifice, means for measuring the differential pressure across the orifice, means independent of the specific gravity for measuring the rate of flow through the orifice, and means for maintaining the fluid flowing through the apparatus at a constant temperature, substantially as described.

7. Apparatus for measuring the specific gravity of fluids, comprising a flow pipe having an obstruction with an orifice, means for measuring the differential pressure across the orifice, a capillary tube in series with the orifice, and means for maintaining the fluid flowing through the orifice and capillary tube at a constant temperature, substantially as described.

8. Apparatus for measuring the specific gravity of fluids, comprising a flow pipe having an obstruction with an orifice, means for recording the differential pressure across the orifice, and means for maintaining a determinate flow of the fluid through the orifice, substantially as described.

9. Apparatus for measuring the specific gravity of fluids, comprising a flow pipe having an obstruction with an orifice, means for recording the differential pressure across the orifice, a capillary tube in series with the orifice, means for maintaining a constant pressure difference between the ends of the capillary tube, means for maintaining a constant outlet pressure on the capillary tube, and means for maintaining the fluid flowing through the orifice and capillary tube at a constant temperature, substantially as described.

10. Apparatus for measuring the specific gravity of fluids, comprising means dependent only on the specific gravity and the flow of fluid through the apparatus for recording the specific gravity, and means for maintaining a determinate rate of flow through said means, substantially as described.

11. Apparatus for measuring the specific gravity of fluids, comprising measuring means dependent on the specific gravity and the rate of flow of the fluid, a capillary tube in series with said means, and automatic variable means for maintaining a constant pressure difference between the ends of the capillary tube, substantially as described.

In testimony whereof we have hereunto set our hands.

THOMAS R. WEYMOUTH.
ROSS P. ANDERSON.
JOSEPH R. FAY.

across the orifice, means independent of the specific gravity for measuring the rate of flow through the orifice, and means for maintaining the fluid flowing through the apparatus at a constant temperature, substantially as described.

7. Apparatus for measuring the specific gravity of fluids, comprising a flow pipe having an obstruction with an orifice, means for measuring the differential pressure across the orifice, a capillary tube in series with the orifice, and means for maintaining the fluid flowing through the orifice and capillary tube at a constant temperature, substantially as described.

8. Apparatus for measuring the specific gravity of fluids, comprising a flow pipe having an obstruction with an orifice, means for recording the differential pressure across the orifice, and means for maintaining a determinate flow of the fluid through the orifice, substantially as described.

9. Apparatus for measuring the specific gravity of fluids, comprising a flow pipe having an obstruction with an orifice, means for recording the differential pressure across the orifice, a capillary tube in series with the orifice, means for maintaining a constant pressure difference between the ends of the capillary tube, means for maintaining a constant outlet pressure on the capillary tube, and means for maintaining the fluid flowing through the orifice and capillary tube at a constant temperature, substantially as described.

10. Apparatus for measuring the specific gravity of fluids, comprising means dependent only on the specific gravity and the flow of fluid through the apparatus for recording the specific gravity, and means for maintaining a determinate rate of flow through said means, substantially as described.

11. Apparatus for measuring the specific gravity of fluids, comprising measuring means dependent on the specific gravity and the rate of flow of the fluid, a capillary tube in series with said means, and automatic variable means for maintaining a constant pressure difference between the ends of the capillary tube, substantially as described.

In testimony whereof we have hereunto set our hands.

THOMAS R. WEYMOUTH.
ROSS P. ANDERSON.
JOSEPH R. FAY.

Certificate of Correction.

It is hereby certified that in Letters Patent No. 1,530,222, granted March 17, 1925, upon the application of Thomas R. Weymouth, Ross P. Anderson, and Joseph R. Fay, of Oil City, Pennsylvania, for an improvement in "Determination of the Specific Gravity of Fluids," an error appears in the printed specification requiring correction as follows: Page 3, line 42, claim 10, for the word "means" read *apparatus;* and that the said Letters Patent should be read with this correction therein that the same may conform to the record of the case in the Patent Office.

Signed and sealed this 28th day of April, A. D. 1925.

[SEAL.]
KARL FENNING,
*Acting Commissioner of Patents.*

Certificate of Correction.

It is hereby certified that in Letters Patent No. 1,530,222, granted March 17, 1925, upon the application of Thomas R. Weymouth, Ross P. Anderson, and Joseph R. Fay, of Oil City, Pennsylvania, for an improvement in " Determination of the Specific Gravity of Fluids," an error appears in the printed specification requiring correction as follows: Page 3, line 42, claim 10, for the word " means " read *apparatus;* and that the said Letters Patent should be read with this correction therein that the same may conform to the record of the case in the Patent Office.

Signed and sealed this 28th day of April, A. D. 1925.

[SEAL.]
KARL FENNING,
*Acting Commissioner of Patents.*